United States Patent
Hori

(10) Patent No.: US 6,839,442 B2
(45) Date of Patent: *Jan. 4, 2005

(54) AUDIO SIGNAL PROCESSING APPARATUS

(75) Inventor: Taizou Hori, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 86 days.

(21) Appl. No.: 09/110,958

(22) Filed: Jul. 7, 1998

(65) Prior Publication Data
US 2002/0110251 A1 Aug. 15, 2002

(30) Foreign Application Priority Data

Jul. 29, 1997 (JP) .............................................. 9-203216

(51) Int. Cl.[7] ................................................ H04B 1/00
(52) U.S. Cl. ...................................... 381/119; 360/13
(58) Field of Search ................................ 381/119, 106, 381/107, 104, 102; 360/13, 62

(56) References Cited

U.S. PATENT DOCUMENTS

| | | | | |
|---|---|---|---|---|
| 3,879,751 A | * | 4/1975 | Gimelli ........................ 360/13 |
| 3,916,104 A | * | 10/1975 | Anazawa et al. ............. 381/26 |
| 4,357,492 A | * | 11/1982 | Campbell et al. ........... 381/107 |
| 4,524,452 A | * | 6/1985 | Marshak ...................... 381/119 |
| 4,571,641 A | * | 2/1986 | Fujiki et al. ................. 386/102 |
| 4,956,726 A | * | 9/1990 | Takimoto et al. ............. 360/27 |
| 4,993,073 A | * | 2/1991 | Sparkes ....................... 381/119 |
| 5,019,922 A | * | 5/1991 | Shiba ............................ 360/27 |
| 5,295,023 A | * | 3/1994 | Sekii ............................ 360/32 |
| 5,805,761 A | * | 9/1998 | Ikeda ............................ 360/61 |
| 6,148,086 A | * | 11/2000 | Ciullo et al. ................. 381/106 |

* cited by examiner

Primary Examiner—Ping Lee
(74) Attorney, Agent, or Firm—Robin, Blecker & Daley

(57) ABSTRACT

In an audio signal processing apparatus for recording a plurality of kinds or systems of audio signals on a recording medium and for reproducing a plurality of kinds or systems of audio signals recorded on the recording medium, in a state where a mixing output mode of mixing the plurality of kinds or systems of audio signals and outputting the mixed audio signals is designated, (i) when a recording operation mode of recording the plurality of kinds or systems of audio signals on the recording medium is designated, the plurality of kinds or systems of audio signals are mixed and outputted while making levels of the plurality of kinds or systems of audio signals equal to each other, and (ii) when a reproducing operation mode of reproducing a plurality of kinds or systems of audio signals recorded on the recording medium is designated, the plurality of kinds or systems of audio signals reproduced from the recording medium are mixed and outputted according to an arbitrarily variable mixing ratio. Thus, the audio signal processing apparatus can record the plurality of kinds or systems of audio signals, effectively utilizing the dynamic range of the recording medium, and can mix and reproduce the plurality of kinds or systems of audio signals in a good reproduction state where S/N is good.

8 Claims, 3 Drawing Sheets

AUDIO SIGNAL PROCESSING APPARATUS

BACKGROUND OF THE INVENTION

1. Field of the Invention

The present invention relates to an audio signal processing apparatus for recording a plurality of kinds or a plurality of systems of audio signals on a recording medium and/or for reproducing a plurality of kinds or a plurality of systems of audio signals recorded on the recording medium.

2. Description of Related Art

At present, there are various audio signal processing apparatuses for recording a plurality of kinds or a plurality of systems of audio signals on a recording medium and/or for reproducing a plurality of kinds or a plurality of systems of audio signals recorded on the recording medium. For example, in the case of a digital video tape recorder (VTR) of the camera-integrated type, a recording format according to which a plurality of kinds of audio signals (namely, two systems of stereophonic audio signals, i.e., a total of four channels of audio signals) can be recorded on magnetic tape together with video signals corresponding to the audio signals, is available.

Further, considering an apparatus capable of recording a plurality of kinds of audio signals in accordance with the aforementioned recording format, for the purpose of making it possible to record the aforesaid plurality of kinds of audio signals in a good S/N condition by effectively utilizing a dynamic range of a magnetic tape serving as a recording medium, it is conceivable that the apparatus is provided with a volume for setting a recording level in each channel in such a manner as to optimally adjust the levels of a plurality of kinds of audio signals (hereinafter, two systems of stereophonic audio signals will be referred to as "stereophonic-1" signal and "stereophonic-2" signal) when both systems of audio signals are recorded together on the magnetic tape. Then, the levels of the plurality of kinds of audio signals are adjusted by operating the volume, and the level-adjusted audio signals are recorded on the magnetic tape. Moreover, when both of the "stereophonic-1" signal and the "stereophonic-2" signal are reproduced together from the magnetic tape, it is conceivable that the apparatus has a mode in which the aforementioned "stereophonic-1" signal and the aforesaid "stereophonic-2" signal are reproduced independently of each other, and another mode in which the "stereophonic-1" signal and the "stereophonic-2" signal are reproduced while being mixed at an arbitrary mixing ratio which is freely settable.

However, in the aforementioned apparatus which is provided with the volume for setting a recording level so as to optimally adjusting the levels of the "stereophonic-1" and "stereophonic-2" signals for recording and is capable of recording the "stereophonic-1" and "stereophonic-2" signals while setting the recording levels hereof by using the volume during recording, and of reproducing the "stereophonic-1" and "stereophonic-2" signals in accordance with the mode of mixing the "stereophonic-1" and "stereophonic-2" signals at an arbitrary mixing ratio which is freely settable during reproduction, there arises the following problem. Depending upon a certain manner of setting the recording levels of the audio signals by the recording-level setting volume, the dynamic range of magnetic tape serving as a recording medium cannot be effectively utilized to record the audio signals. Moreover, during reproduction, if the "stereophonic-1" and "stereophonic-2" signals are mixed at a desired mixing ratio so as to be reproduced, the state of reproduction results in poor S/N.

BRIEF SUMMARY OF THE INVENTION

An object of the present invention is to provide an audio signal processing apparatus which can solve the aforementioned problems of the conventional apparatus.

Another object of the present invention is to provide an audio signal processing apparatus which can record a plurality of kinds of audio signals while effectively utilizing the dynamic range of a recording medium and can reproduce a plurality of kinds of audio signals recorded on the recording medium, while mixing such audio signals in a reproduction state where S/N is good.

To achieve the above objects, in accordance with an aspect of the present invention, there is provided an audio signal processing apparatus for recording a plurality of kinds of audio signals on a recording medium and for reproducing a plurality of kinds of audio signals recorded on the recording medium, which comprises output mode designating means, having a selecting output mode of selecting an arbitrary kind of audio signal from among a plurality of kinds of audio signals and outputting the selected kind of audio signal and a mixing output mode of mixing the plurality of kinds of audio signals and outputting the mixed audio signals, for designating one of the selecting output mode and the mixing output mode, operation mode designating means, having a recording operation mode of recording a plurality of kinds of audio signals on the recording medium and a reproducing operation mode of reproducing a plurality of kinds of audio signals recorded on the recording medium, for designating one of the recording operation mode and the reproducing operation mode, and audio signal mixing means for, in a state where the mixing output mode is designated by the output mode designating means, (i) when the recording operation mode is designated by the operation mode designating means, mixing the plurality of kinds of audio signals while making levels of the plurality of kinds of audio signals equal to each other, and outputting the mixed audio signals, and (ii) when the reproducing operation mode is designated by the operation mode designating means, mixing the plurality of kinds of audio signals reproduced from the recording medium according to an arbitrarily variable mixing ratio, and outputting the mixed audio signals.

Still another object of the present invention is to provide an audio signal processing apparatus which can record a plurality of systems of audio signals by effectively utilizing the dynamic range of a recording medium and can reproduce a plurality of systems of audio signals recorded on the recording medium, while mixing such audio signals in a reproduction state where S/N is good.

To achieve the above objects, in accordance with another aspect of the present invention, there is provided an audio signal processing apparatus for recording a plurality of systems of audio signals on a recording medium and for reproducing a plurality of systems of audio signals recorded on the recording medium, which comprises output mode designating means, having a selecting output mode of selecting an arbitrary system of audio signal from among a plurality of systems of audio signals and outputting the selected system of audio signal and a mixing output mode of mixing the plurality of systems of audio signals and outputting the mixed audio signals, for designating one of the selecting output mode and the mixing output mode, operation mode designating means, having a recording operation mode of recording a plurality of systems of audio signals on the recording medium and a reproducing operation mode of reproducing a plurality of systems of audio signals recorded on the recording medium, for designating one of the recording operation mode and the reproducing operation mode, and audio signal mixing means for, in a state where the mixing output mode is designated by the output mode designating means, (i) when the recording operation mode is designated by the operation mode designating means, mixing the plurality of systems of audio signals while making levels of the plurality of systems of audio signals equal to each other, and outputting the mixed audio signals, and (ii) when the reproducing operation mode is designated by the operation mode designating means, mixing the plurality of systems of audio signals reproduced from the recording medium according to an arbitrarily variable mixing ratio, and outputting the mixed audio signals.

Other objects and features of the present invention will become apparent from the following detailed description of a preferred embodiment thereof taken in conjunction with the accompanying drawings.

DETAILED DESCRIPTION OF THE INVENTION

Hereinafter, a preferred embodiment of the present invention will be described in detail with reference to the drawings.

Figure 1:
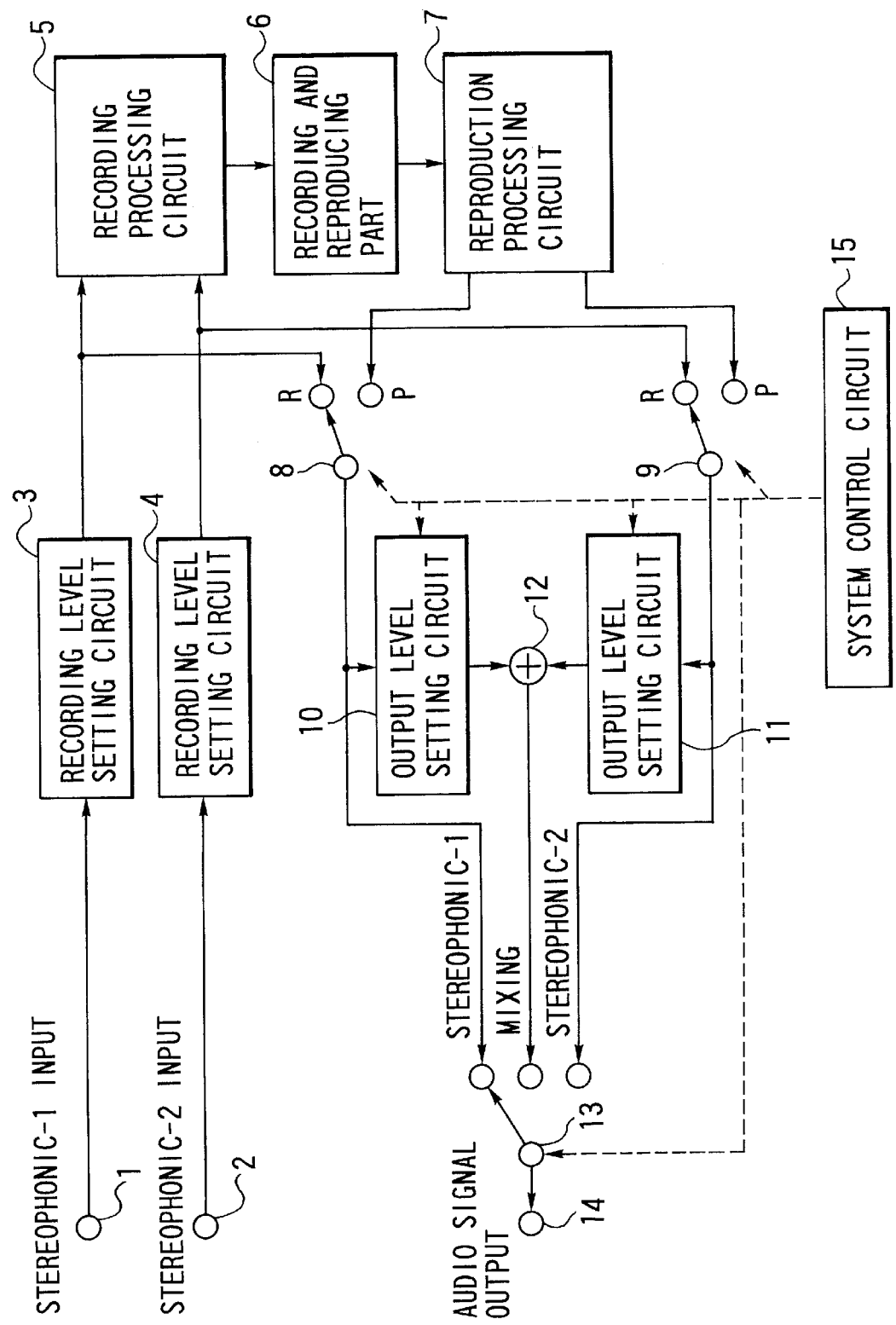
FIG. 1 is a block diagram schematically showing the configuration of an audio signal processing apparatus according to an embodiment of the present invention.
Figure 2:
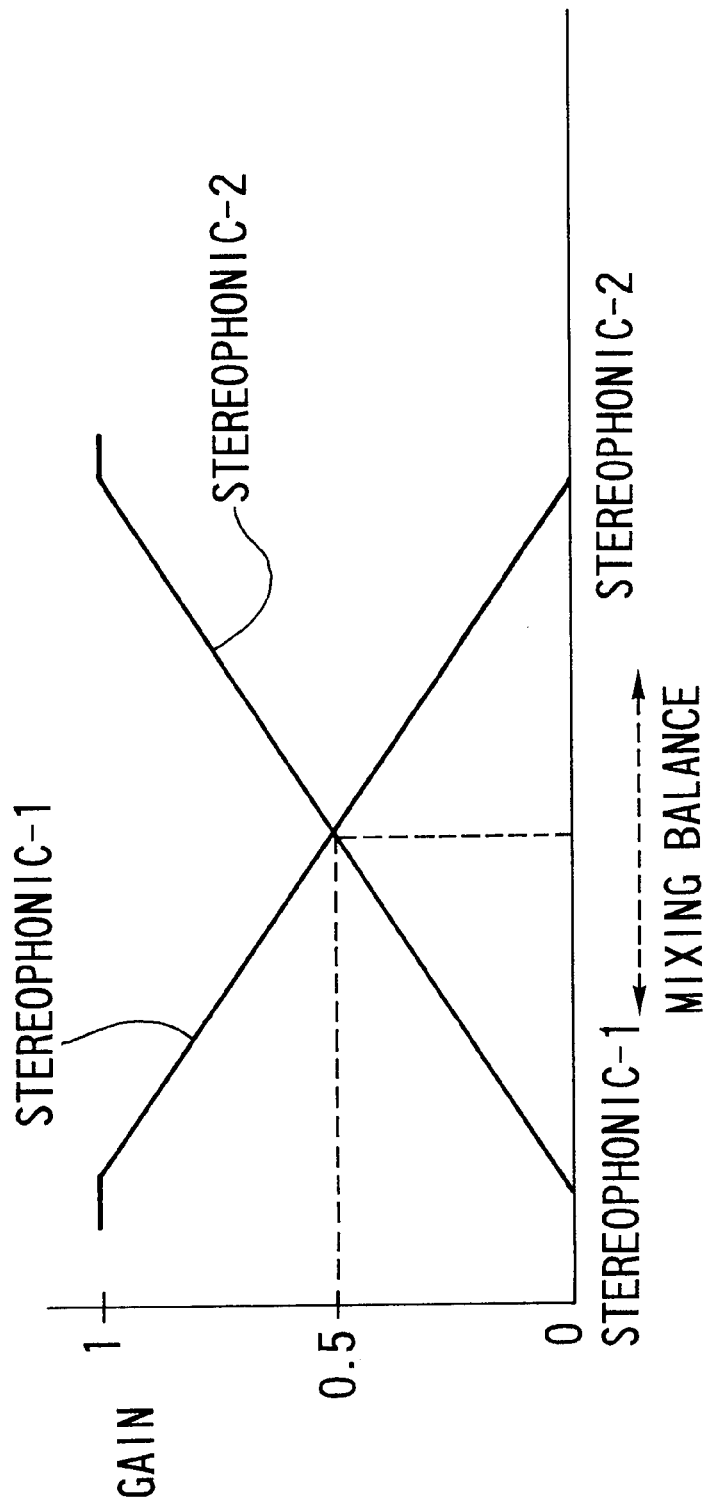
FIG. 2 is a diagram for illustrating an operation of adjusting the mixing balance in the audio signal processing apparatus shown in FIG. 1.
Figure 3:
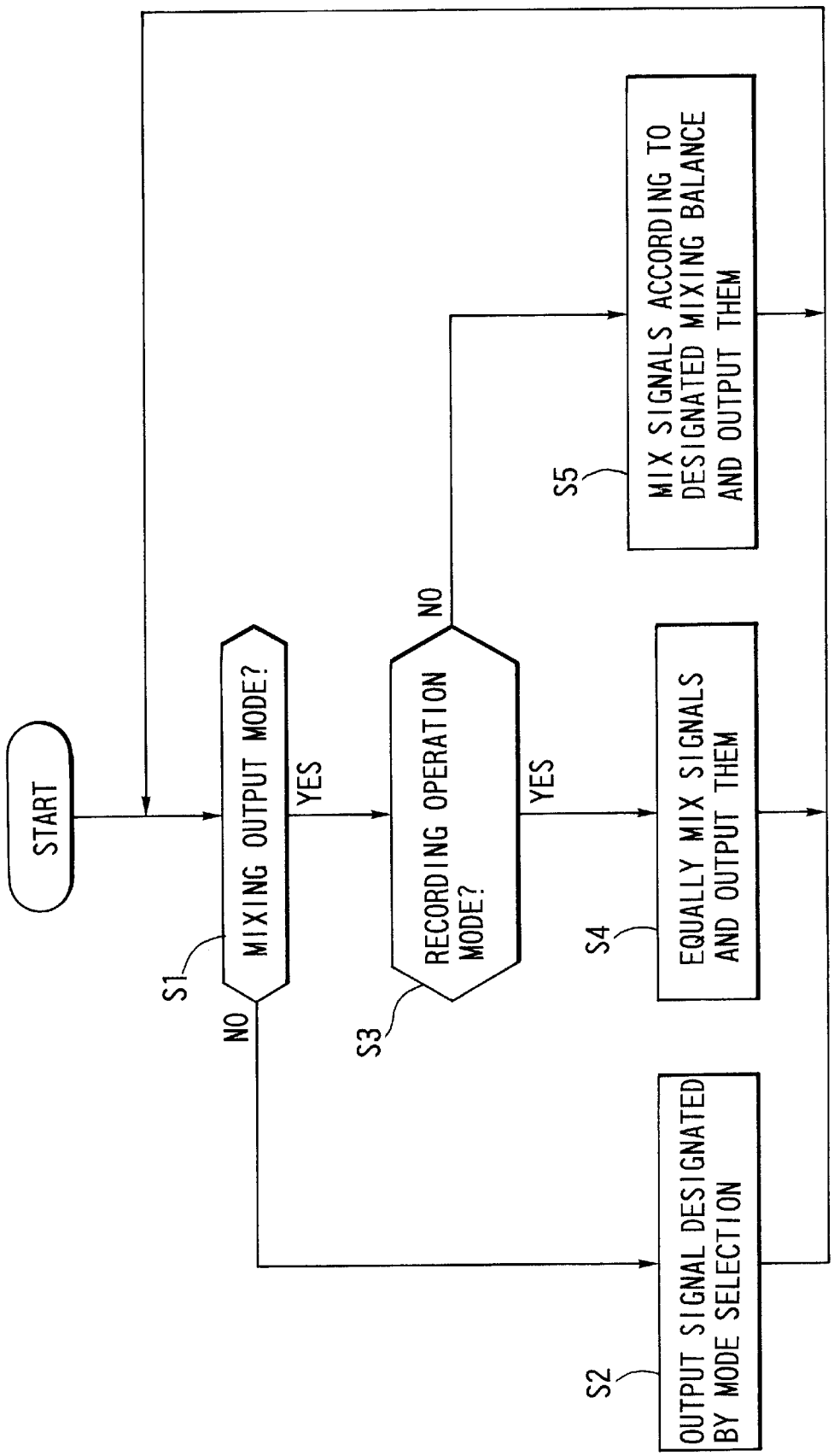
FIG. 3 is a flowchart illustrating an operation of the audio signal processing apparatus shown in FIG. 1.

FIGS. 1 to 3 are diagrams for illustrating the embodiment of the present invention. FIG. 1 is a block diagram schematically showing the configuration of an apparatus for recording two systems of stereophonic audio signals on a recording medium and for reproducing two systems of stereophonic audio signals recorded on the recording medium.

In FIG. 1, reference numeral 1 denotes an input terminal for a "stereophonic-1" audio signal, reference numeral 2 denotes an input terminal for a "stereophonic-2" audio signal, reference numeral 3 denotes a recording level setting circuit for setting a recording level at which the "stereophonic-1" audio signal is recorded, reference numeral 4 denotes a recording level setting circuit for setting a recording level at which the "stereophonic-2" audio signal is recorded, reference numeral 5 denotes a recording processing circuit for converting an input signal into a recording signal form suitable for recording on the recording medium and for outputting the converted signal, reference numeral 6 denotes a recording and reproducing part for recording a signal on the recording medium, such as magnetic tape or a magnetic disk, and for reproducing a signal recorded on the recording medium, reference numeral 7 denotes a reproduction processing circuit for restoring an original signal from the signal reproduced by the recording and reproducing part 6 and for outputting the restored original signal, reference numerals 8 and 9 denote output change-over switches for changing over between outputting of signals which are the same as the signals supplied to the recording processing circuit 5 and outputting of signals reproduced by the reproduction processing circuit 7 according to whether the apparatus is in the recording operation mode or the reproducing operation mode, reference numeral 10 denotes an output level setting circuit for setting an output level at which the "stereophonic-1" audio signal is outputted, reference numeral 11 denotes an output level setting circuit for setting an output level at which the "stereophonic-2" audio signal is outputted, reference numeral 12 denotes a mixing circuit for mixing the "stereophonic-1" audio signal and the "stereophonic-2" audio signal and outputting the mixed signals, reference numeral 13 denotes an output mode selecting switch for selection between an output mode of individually outputting one of the "stereophonic-1" audio signal and the "stereophonic-2" audio signal and another output mode of mixing the "stereophonic-1" audio signal and the "stereophonic-2" audio signal and outputting the mixed audio signals, reference numeral 14 denotes a monitoring output terminal for outputting an audio signal to a monitor device, such as a speaker, a headphone and a level meter, and reference numeral 15 denotes a system control circuit for controlling each of the switches 8, 9 and 13 and the output level setting circuits 10 and 11 according to the operation modes.

Incidentally, although one system of stereophonic audio signal is indicated by a single line in FIG. 1, the constituent elements of the actual apparatus are connected to one another by two cables respectively corresponding to audio signals of two channels, namely, the left and right channels Lch and Rch.

An operation of the audio signal processing apparatus illustrated in FIG. 1 according to the embodiment of the present invention will be described below.

As shown in FIG. 1, the "stereophonic-1" audio signal and the "stereophonic-2" audio signal are inputted to the input terminals 1 and 2, respectively.

In the recording level setting circuit 3, the recording level of the "stereophonic-1" audio signal inputted from the input terminal 1 is set. Further, in the recording level setting circuit 4, the recording level of the "stereophonic-2" audio signal inputted from the input terminal 2 is set. The audio signals the recording levels of which have been set are supplied to the recording processing circuit 5 provided at the next stage, and are also supplied to terminals R of the output change-over switches 8 and 9, respectively, as shown in FIG. 1.

Then, in the recording processing circuit 5, the "stereophonic-1" audio signal and the "stereophonic-2" audio signal respectively outputted from the recording level setting circuits 3 and 4 are converted into signals having a recording signal form which is suitable for recording on the recording medium. Subsequently, the signals obtained as a result of such a conversion is recorded on the recording medium (not shown) in the recording and reproducing part 6.

On the other hand, in the reproduction processing circuit 7, a process which is reverse to the conversion process performed in the recording processing circuit 5 is performed on signals reproduced from the recording medium in the recording and reproducing part 6. As a result, the original "stereophonic-1" and "stereophonic-2" audio signals are restored from the reproduced signals and are then supplied to terminals P of the output change-over switches 8 and 9, respectively, as shown in FIG. 1.

Further, in a case where the operation mode of the apparatus is set to the recording operation mode by operating an operation key (not shown), the position of each of the output change-over switches 8 and 9 is set to the terminal R thereof in accordance with an instruction or command issued from the system control circuit 15, so that signals outputted from the recording level setting circuits 3 and 4 are sent also to the monitoring output terminal 14 through the output level setting circuits 10 and 11, the mixing circuit 12 and the output mode selecting switch 13. Accordingly, the user can set the respective recording levels at which the "stereophonic-1" and "stereophonic-2" audio signals are recorded, by operating the setting volumes respectively provided in the recording level setting circuits 3 and 4 while monitoring the "stereophonic-1" and "stereophonic-2" audio signals, which are to be recorded on the recording medium, by means of the monitor device, such as a speaker, a headphone or a level meter, connected to the monitoring output terminal 14.

Incidentally, a signal to be outputted from the monitoring output terminal 14 to the monitor device (not shown) can be selected by the output mode selecting switch 13 in accordance with a selection instruction or command which is outputted from the system control circuit 15 by operating the operation key (not shown). Thus, a signal selected by the output mode selecting switch 13 is outputted to the monitoring output terminal 14.

Further, in a case where the operation mode of the apparatus is set to the reproducing operation mode by operating the operation key (not shown), the position of each of the output change-over switches 8 and 9 is set to the terminal P thereof in accordance with an instruction or command outputted from the system control circuit 15, so that the "stereophonic-1" and "stereophonic-2" audio signals outputted from the reproduction processing circuit 7 are sent to the monitoring output terminal 14 through the output level setting circuits 10 and 11, the mixing circuit 12 and the output mode selecting switch 13. Accordingly, the user can monitor the "stereophonic-1" and "stereophonic-2" audio signals, which are recorded on the recording medium, by means of the monitor device, such as a speaker, a headphone or a level meter, connected to the monitoring output terminal 14.

Incidentally, a signal to be outputted from the monitoring output terminal 14 to the monitor device (not shown) can be selected by the output mode selecting switch 13 in accordance with a selection instruction or command which is outputted from the system control circuit 15 by operating the operation key (not shown). Similarly as in the case of the recording operation mode, a signal selected. by the output mode selecting switch 13 is outputted to the monitoring output terminal 14.

In the audio signal processing apparatus according to the embodiment of the present invention, when a "stereophonic-1" or "stereophonic-2" output mode, in which a "stereophonic-1" audio signal or a "stereophonic-2" audio signal is singly outputted, is selected and designated by operating the operation key (not shown) as above stated, the system control circuit 15 controls the connection condition of the output mode selecting switch 13 according to the designated output mode (namely, when the "stereophonic-1" output mode is designated, the switch 13 is set in the position STEREOPHONIC-1 (corresponding to the "stereophonic-1"-side terminal) shown in FIG. 1, and when the "stereophonic-2" output mode is designated, the switch 13 is set in the position STEREOPHONIC-2 shown in FIG. 1) (in steps S1 and S2 in FIG. 3). Further, in a case where a mixing output mode, in which mixed audio signals obtained by mixing the "stereophonic-1" and "stereophonic-2" audio signals are outputted, is selected and designated, the output mode change-over switch 13 is set in the position MIXING (corresponding to the "mixed-output-mode"-side terminal) shown in FIG. 1. An operation of the apparatus in the case of selecting the mixing output mode, in which mixed audio signals obtained by mixing the "stereophonic-1" and "stereophonic-2" audio signals are outputted, will be described below.

When the mixing output mode is selected and designated, the system control circuit 15 controls the signal gain which is set in each of the output level setting circuits 10 and 11, according to whether the apparatus is operating in accordance with the recording operation mode or the reproducing operation mode.

Specifically, when the apparatus is operating in accordance with the recording operation mode, the signal gain which is set in each of the output level setting circuits 10 and 11 is so controlled that the "stereophonic-1" audio signal and the "stereophonic-2" audio signal are equally mixed at the mixing circuit 12 and the mixed audio signals are outputted from the monitoring output terminal 14 (in steps S3 and S4 of FIG. 3). On the other hand, when the apparatus is operating in accordance with the reproducing operation mode, the signal gain which is set in each of the output level setting circuits 10 and 11 is so controlled that the "stereophonic-1" audio signal and the "stereophonic-2" audio signal are mixed at the mixing circuit 12 at a mixing ratio corresponding to the mixing balance between the "stereophonic-1" audio signal and the "stereophonic-2" audio signal, which is set by operating the operation key (not shown) (in steps S3 and S5 of FIG. 3).

As described above, in the audio signal processing apparatus according to the embodiment, at the time of reproduction of audio signals, the user can arbitrarily set the levels of audio signals which are outputted from the monitoring output terminal 14. For example, in a case where the "stereophonic-2" audio signal is to be supplied to the monitor device in such a manner as to have a high signal level, the "mixing balance" can be set at a value which is at the right-hand side on the axis of abscissa in the graph of FIG. 2, by operating the operation key (not shown), so that the signal gain in each of the output level setting circuits 10 and 11 is set in such a manner that the "stereophonic-1" and "stereophonic-2" audio signals are mixed at a mixing ratio at which the level of the "stereophonic-1" audio signal is low and the level of the "stereophonic-2" audio signal is high, and the mixed audio signals are outputted from the monitoring output terminal 14. On the other hand, at the time of recording of audio signals, when the user adjusts the recording levels of the "stereophonic-1" audio signal and the "stereophonic-2" audio signal to be recorded on the recording medium, by operating the setting volume provided in each of the recording level setting circuits 3 and 4 while monitoring the "stereophonic-1" audio signal and the "stereophonic-2" audio signal, it is not necessary for the user to adjust the gain in each of the output level setting circuits 10 and 11 in such a manner as to set off the recording levels of the "stereophonic-1" audio signal and the "stereophonic-2" audio signal set at the recording level setting circuits 3 and 4 so that the balance between the "stereophonic-1" and "stereophonic-2" audio signals which are contained in the mixed audio signals outputted from the monitoring output terminal 14 is maintained. Thus, in a case where the mixing output mode is selected by operating the output mode selecting switch 13, at the time of recording of audio signals, the output levels of the output level setting circuits 10 and 11 are automatically set by the system control circuits 15 in such a manner that the "stereophonic-1" audio signal and the "stereophonic-2" audio signal are outputted always in an equally mixed condition. Accordingly, the user can set optimum recording levels, effectively using the dynamic range of the recording medium, while monitoring the mixed audio signals which are obtained by mixing the "stereophonic-1" audio signal and the "stereophonic-2" audio signal. Consequently, S/N of the mixed audio signals at the time of reproduction can be enhanced.

Incidentally, although the embodiment has been described with respect to two systems of audio signals, the present invention is effectively applied to audio signal processing apparatuses that process three or more systems of audio signals.

As above described, in accordance with the present invention, there is provided an audio signal processing apparatus which can record a plurality of kinds or a plurality of systems of audio signals, effectively utilizing the dynamic range of the recording medium, and can mix and reproduce a plurality of kinds or a plurality of systems of audio signals in a good reproduction state where S/N is good.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An audio signal processing apparatus for recording a plurality of audio signals on a recording medium and for reproducing the audio signals from the recording medium, comprising:

(A) output mode designating means for selectively designating a first output mode in which each of the audio signals is selected and output as an audio signal output and a second output mode in which the audio signals are mixed with each other and output as the audio signal output;

(B) level adjusting means for adjusting each level of the audio signals;

(C) operation mode designating means for designating a recording operation mode of recording the audio signals on the recording medium and a reproducing operation mode of reproducing the audio signals from the recording medium; and (D) audio signal mixing means, in the state that the second output mode is designated by said output mode designating means, for mixing the audio signals reproduced from the recording medium on the basis of the levels, which are adjusted by said level adjusting means, being arbitrarily variable to desire value in the reproducing operation mode, and for automatically and forcibly mixing the audio signals so as to become a mixing ratio substantially 1:1 in the recording operation mode regardless of the levels adjusted by said level adjusting means.

2. An audio signal processing apparatus according to claim 1, wherein each of the plurality of audio signals is composed of two channels of audio signals.

3. An audio signal processing apparatus according to claim 1, wherein each of the plurality of audio signals is composed of a stereophonic audio signal.

4. An audio signal processing apparatus according to claim 1, wherein said audio signal processing apparatus is arranged to record, together with a plurality of kinds of audio signals, a video signal corresponding to the plurality of audio signals on the recording medium, and to reproduce a plurality of audio signals recorded on the recording medium and a video signal recorded thereon correspondingly to the plurality of audio signals.

5. An audio signal processing apparatus for recording a plurality of audio signals on a recording medium and for reproducing the audio signals from the recording medium, comprising:

(A) output mode selector selects a first output mode in which each of the audio signals is selected or a second output mode in which the audio signals are mixed with each other;

(B) operation mode selector selects a recording operation mode of recording the audio signals on the recording medium or a reproducing operation mode of reproducing the audio signals from the recording medium;

(C) level setting circuit adjusts each level of the audio signals;

(D) audio signal mixing circuit connected to said level selling circuit, in the state that the second output mode is selected by said output mode selector, mixes the audio signals reproduced from the recording medium on the basis of the levels adjusted by said level setting circuit being arbitrarily variable to desire value when the reproducing operation mode is selected by said operation mode selector, and automatically and forcibly mixes the audio signals so as to become a mixing ratio substantially 1:1 regardless of the levels adjusted by said level setting circuit when the recording operation mode is selected by said operation mode selector; and (E) audio output circuit selectively outputs the each of the audio signals or a mixed audio signal mixed said audio signal mixing circuit.

6. An audio signal processing apparatus according to claim 5, wherein each of the plurality of audio signals is composed of two channels of audio signals.

7. An audio signal processing apparatus according to claim 5, wherein each of the plurality of audio signals is composed of a stereophonic audio signal.

8. An audio signal processing apparatus according to claim 5, wherein said level setting circuit includes a plurality of level setting units for adjusting each of the plurality of audio signals.

* * * * *

UNITED STATES PATENT AND TRADEMARK OFFICE
CERTIFICATE OF CORRECTION

PATENT NO.         : 6,839,442 B2
APPLICATION NO. : 09/110958
DATED              : January 4, 2005
INVENTOR(S)        : Taizou Hori Page 1 of 1

It is certified that error appears in the above-identified patent and that said Letters Patent is hereby corrected as shown below:

Column 4, line 21, delete "switches 8, 9, and 13" and insert --switches 8, 9 and 10--

Signed and Sealed this

Fifth Day of December, 2006

JON W. DUDAS
*Director of the United States Patent and Trademark Office*